US006957962B2

(12) United States Patent
Tomino et al.

(10) Patent No.: US 6,957,962 B2
(45) Date of Patent: Oct. 25, 2005

(54) MOUNTING METHOD, MOUNTING PIECE, AND MOUNTING SYSTEM FOR NETWORK CONCENTRATOR

(75) Inventors: Hiroyuki Tomino, Tokyo (JP); Hiroyuki Inoue, Yokohama (JP)

(73) Assignee: Allied Telesis K.K., Tokyo (JP)

( * ) Notice: Subject to any disclaimer, the term of this patent is extended or adjusted under 35 U.S.C. 154(b) by 0 days.

(21) Appl. No.: 10/372,249

(22) Filed: Feb. 25, 2003

(65) Prior Publication Data

US 2004/0166699 A1 Aug. 26, 2004

(51) Int. Cl.[7] ................................................ H02G 3/10
(52) U.S. Cl. ...................................... 439/40; 248/206.5
(58) Field of Search ........................ 248/206.5, 221.12, 248/222.41, 223.21, 683; 439/38–40; 211/26

(56) References Cited

U.S. PATENT DOCUMENTS 1,171,198 A * 2/1916 Hellberg ................ 248/223.21
3,706,882 A * 12/1972 Eby ............................ 439/36
4,544,067 A * 10/1985 Miller ....................... 211/70.6
5,368,268 A * 11/1994 Jodwischat ................. 248/683
6,478,271 B1 * 11/2002 Mulholland ................. 248/683

FOREIGN PATENT DOCUMENTS

| | | |
|---|---|---|
| JP | 11-275733 | 10/1999 |
| JP | 2002-223292 | 8/2002 |

* cited by examiner

*Primary Examiner*—Renee Luebke
(74) *Attorney, Agent, or Firm*—Oblon, Spivak, McClelland, Maier & Neustadt, P.C.

(57) ABSTRACT

A network concentrator is mounted on a mounting surface using a mounting piece. The network concentrator includes a mounting hole in a mounting part. If the mounting surface is not magnetic, a protrusion such as a screw is inserted into the mounting hole. If the mounting surface is magnetic, a mounting piece is used. The mounting piece has such a form as to be inserted into the mounting hole, and is provided with a magnet. The magnet is attached to the mounting surface, and a part of the mounting piece is inserted into the mounting hole to mount the network concentrator on the mounting surface.

4 Claims, 3 Drawing Sheets

MOUNTING METHOD, MOUNTING PIECE, AND MOUNTING SYSTEM FOR NETWORK CONCENTRATOR

BACKGROUND OF THE INVENTION

1. Field of the Invention

The present invention relates to a mounting method, mounting piece, and mounting system for a network concentrator used in a local area network (LAN), a wide area network (WAN), and so on, such as a hub, bridge, and router.

2. Related Background Art

Conventional network concentrators have been either a rack mounting type or a station type. However, it becomes more common that a network concentrator is mounted on a wall for smaller mounting space and easier handling.

When mounting a conventional network concentrator on a wall surface, special fittings are screwed to a body of the concentrator and the wall surface, or, a magnet is provided on a rear surface of the body of concentrator, thereby attaching the concentrator on a magnetic mounting surface. There is also a case providing both threaded hole and magnet on the rear surface of the concentrator body.

However, the concentrator having on its rear surface both the threaded hole and the magnet has a complicated configuration. Besides, such a concentrator is large in size due to a space required for the threaded hole and the magnet. Especially, the thickness projecting from the wall surface on which the concentrator is mounted becomes greater; thus forming an obstacle to doing work around there.

SUMMARY OF THE INVENTION

As described above, a conventional network concentrator has a problem of a complicated configuration.

The present invention has been accomplished to solve the above problem and an object of the present invention is thus to provide a mounting method, mounting piece, and mounting system for a network concentrator capable of mounting a network concentrator on a mounting surface in a simple configuration.

A mounting method according to the present invention is a method of mounting a network concentrator on a mounting surface using a mounting piece having a magnet and a projecting portion and being a separate part from the network concentrator, including steps of preparing a network concentrator having a contact surface to contact with a mounting surface, the contact surface having a mounting hole; when the mounting surface is not magnetic, inserting a protrusion provided on the mounting surface into the mounting hole; when the mounting surface is magnetic, attaching the mounting piece to the mounting surface by the magnet, and inserting the projecting portion of the mounting piece into the mounting hole of the network concentrator. In this configuration, it is possible to mount a network concentrator on a mounting surface in a simple configuration.

It is preferable that the mounting hole of the network concentrator has an inserting portion having a circular shape and a holding portion extending with a width smaller than a diameter of the inserting portion in which the projecting portion of the mounting piece is inserted into the inserting portion and then shifted to the holding portion. This configuration allows the network concentrator to be fastened to the mounting'piece in a simple configuration.

It is also preferable that the projecting portion of the mounting piece has a head portion having a width wider than the holding portion and narrower than the inserting portion and a neck portion having a width narrower than the holding portion.

A mounting piece according to the present invention is a mounting piece for mounting a network concentrator having a mounting hole on a magnetic mounting surface, provided with a projecting portion to be inserted into the mounting hole and a magnet to be attached to the mounting surface.

A mounting system according to the present invention is a mounting system for mounting a network concentrator on a mounting surface, including a network concentrator having a mounting hole on a contact surface to contact with the mounting surface and a mounting piece having a projecting portion and a magnet, the mounting piece being a separate part from the network concentrator, the projecting portion to be inserted into the mounting hole, and the magnet to be attached to a magnetic mounting surface.

Another mounting method according to the present invention is a method of mounting a network concentrator on a mounting surface using a mounting piece having a mounting hole, being entirely or partly magnetic, and being a separate part from the network concentrator, having steps of preparing a network concentrator having a contact surface to contact with a mounting surface, the contact surface having a magnet; when the mounting surface is magnetic, attaching the magnet to the mounting surface; and, when the mounting surface is not magnetic, inserting a protrusion provided on the mounting surface into the mounting hole provided on the mounting piece, and attaching the mounting piece to the magnet. In this configuration, it is possible to mount a network concentrator on a mounting surface in a simple configuration.

Another mounting piece according to the present invention is a mounting piece for mounting a network concentrator having a magnet on a mounting surface provided with a protrusion, wherein a mounting piece is entirely or partly magnetic, formed separately from the network concentrator, and provided with a mounting hole into which a protrusion provided on the mounting surface is inserted.

A mounting system according to the present invention is a mounting system for mounting a network concentrator on a mounting surface, including a network concentrator having a magnet on a contact surface to contact with the mounting surface; and a mounting piece being entirely or partly magnetic, formed separately from the network concentrator, and having a mounting hole into which a protrusion provided on the mounting surface is inserted.

The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

In the following, a mounting method of a network concentrator according to the first embodiment of the present invention will be explained with reference to FIGS. 1, 2, and 3.

Figure 1:
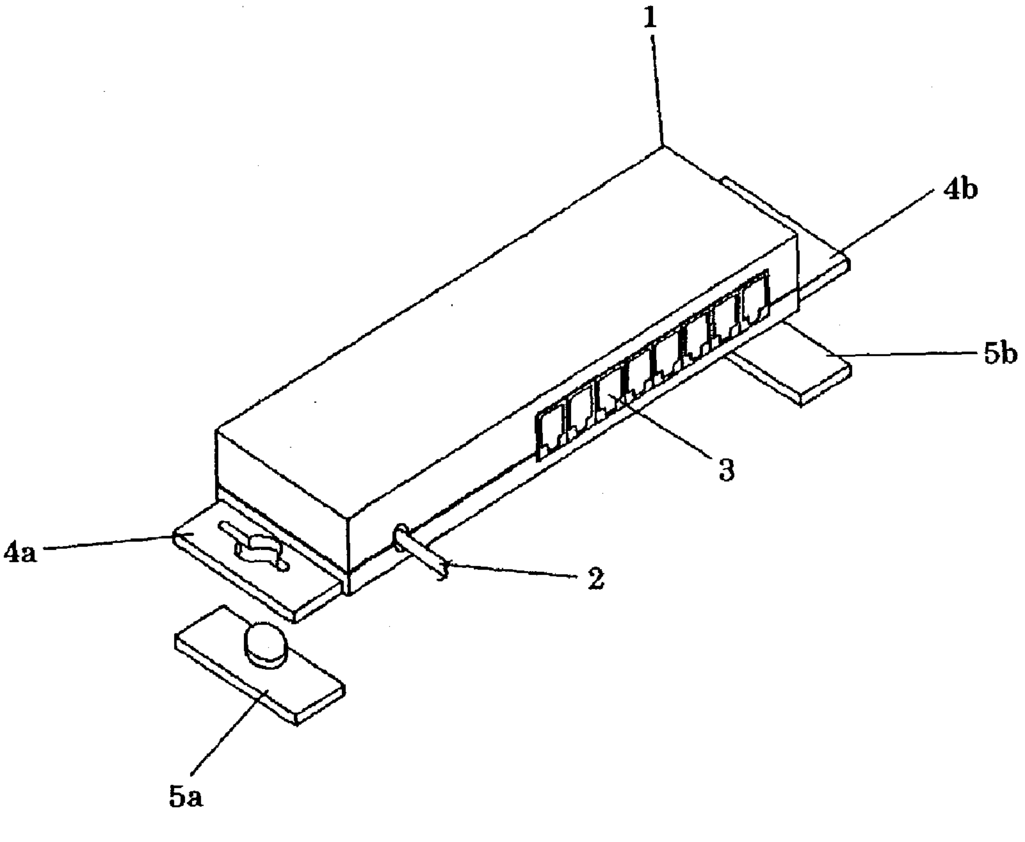
FIG. 1 is a perspective view to show a network concentrator and a mounting piece according to the first embodiment of the present invention.

FIG. 1 is a perspective view to show a configuration of a network concentrator and a mounting piece according to the first embodiment of the present invention. As shown therein, a body of the network concentrator 1 is elongated. The network concentrator 1 is normally mounted with its longer side extending laterally on a mounting surface that is like a wall in terms of being substantially perpendicular to the ground. A power cord 2 and a connector 3 are provided on the surface which serves as a lower surface of the network concentrator 1 when it is mounted on the mounting surface.

One end of the power cord 2 is provided with a plug, which is to be inserted into a socket for receiving commercial alternating current power. The other end of the power cord 2 is connected to a power supply circuit provided in the network concentrator 1. The power supply circuit converts the commercial alternating current power to operating power of a network control circuit, oscillator, display unit control circuit, display unit, and other components of the network concentrator 1, and supplies the power.

The connector 3 is a modular jack connector, and a communication cable from a terminal such as a personal computer is connected thereto. Though, in this case, there are provided 8 connection ports to allow 8 communication cables to be connected, it is not restricted thereto, whereas single or any number of plural communication ports may be provided. It is also possible to provide a D-Sub connector in addition to the modular jack connector.

There is provided a display, which is not shown in the figure, displaying communication status of the connector 3, on an upper surface of the network concentrator 1. The display includes Light Emitting Diode (LED) section and a description section of LED on/off, for example.

There is provided a mounting part 4*a* on a left side surface of the network concentrator 1. Amounting part 4*b* is provided on a right side surface of the network concentrator 1. The mounting parts 4*a* and 4*b* are symmetrical to each other. The mounting parts 4*a* and 4*b* project to the left and right respectively from the main body of the network concentrator 1, which will be referred to hereinafter as the main body. The mounting parts 4*a* and 4*b* are positioned on the same surface as the surface of the main body to contact with a mounting surface. The mounting parts 4*a* and 4*b* therefore contact with the mounting surface when the main body is mounted thereon.

A configuration of the mounting part 4 will be explained hereinbelow with reference to FIG. 2 that is an enlarged view thereof. The mounting part 4 is given a mounting hole 41 on its substantially middle position. The mounting hole 41, which penetrates the mounting part 4, consists of an inserting portion 411 and a holding portion 412. The inserting portion 411 is a circular penetration hole. The holding portion 412 has the width smaller than the diameter of the inserting portion 411, and extends upward and downward in a mounted state. The inserting portion 411 has semicircular ends.

As shown in FIG. 1, the network concentrator 1 is fixed to a mounting surface using a mounting piece 5. The mounting piece 5 is a separate part from the network concentrator 1. Two of the mounting pieces 5*a* and 5*b* are used in this case.

The mounting piece 5 will be detailed hereinbelow with reference to FIG. 3. The mounting piece 5 consists of a head portion 51, a neck portion 52, a magnet holding portion 53, and a magnet 54. The head portion 51 has a cylindrical form. The neck portion 52 also has a cylindrical form, joining and fixing the head portion 51 to the magnet holding portion 53. The diameter of the neck portion 52 is smaller than that of the head portion 51. The magnet holding portion 53 holds the magnet 54. The head portion 51, neck portion 52, and magnet holding portion 53 are formed by integral molding of synthetic resin, for example. The magnet 54 is embedded in the magnet holding portion 53 and fixed thereto by an adhesive agent or the like. Although an mounting surface of the magnet 54 is exposed to the outside in this case, the magnet 54 may be entirely covered with the magnet holding portion 53.

Next, the size of the mounting part 4 and the mounting piece 5 will be explained with reference to FIGS. 2 and 3. In the mounting part 4, the diameter of the inserting portion 411 of the mounting hole is $\phi A$. The width of the holding portion 412, that is, the diameter of the semicircle at the end of the holding portion 412, is $\phi B$. The thickness of the mounting part 4 at the periphery of the mounting hole 41 is T1. In the mounting piece 5, the diameter of the head portion 51 is $\phi C$. The diameter of the neck portion 52 is $\phi D$. The height of the neck portion 52 is T2. Each element satisfies the following conditions.

$$\phi A \geqq \phi C$$

$$\phi B \geqq \phi D$$

$$T1 \leqq T2$$

If the above conditions are satisfied, it is possible to fix the mounting piece 5 to the mounting part 4 by inserting the head portion 51 into the inserting portion 411 of the mounting hole 41 to bring the mounting part 4 into contact with an upper surface of the magnet holding portion 53, and then shifting the mounting part 4 to such a position that the neck portion 52 is engaged into the holding portion 412. The mounting piece 5, which has been fixed to the mounting part 4, is then brought into contact with a magnetic mounting surface, and magnetic force of the magnet 54 allows the network concentrator 1 to be mounted on the mounting surface.

It is also possible to mount the mounting piece 5 on the mounting surface in advance, and then insert the head portion 51 of the mounting piece 5 into the inserting hole 41 of the network concentrator 1, thereby mounting the network concentrator 1 on the mounting surface.

In a case where the mounting surface is not magnetic and the magnet 54 is not available for mounting, the mounting can be done by providing a screw or the like on the mounting surface, inserting the screw into the inserting portion 411, and engaging the screw into the holding portion 412.

Figure 4:
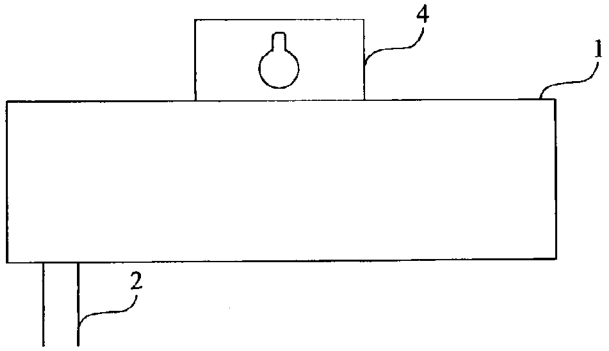
FIG. 4 is a view to show a network concentrator according to the second embodiment of the present invention.

FIG. 4 shows a configuration of a network concentrator 1 according to the second embodiment of the present invention. The network concentrator 1 according to the present embodiment has the same configuration as the network concentrator 1 according to the first embodiment explained above, except the mounting part 4.

As shown in FIG. 4, the mounting part 4 is provided at a position to be an upper middle part of the concentrator 1 in a mounted state. The mounting part 4 therefore projects from the surface having a display. The mounting part 4 is positioned on the same surface as the surface of the main body to contact with a mounting surface. The mounting part 4 therefore contacts with the mounting surface when the main body is mounted thereon.

Figure 2:
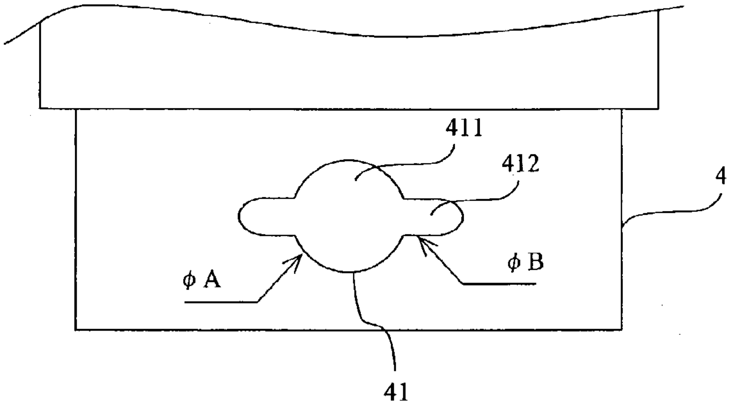
FIG. 2 is a view to show a mounting part of a network concentrator according to the first and second embodiment of the present invention.
Figure 3:
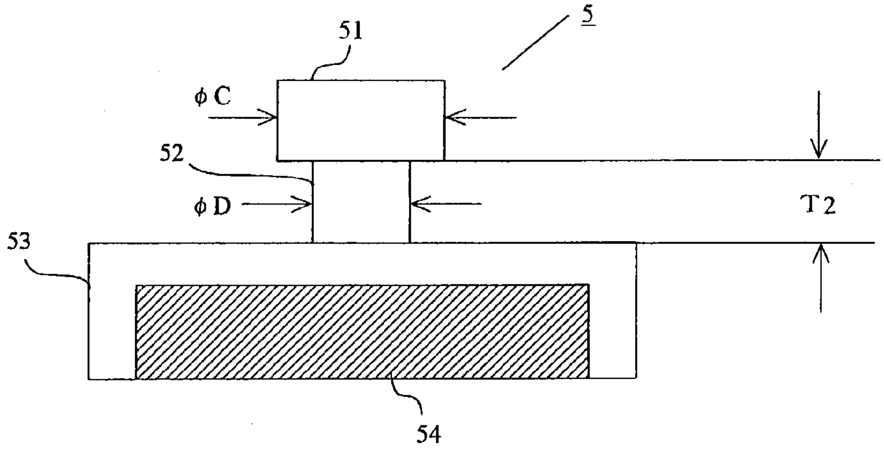
FIG. 3 is a view to show a mounting piece according to the first and second embodiments of the present invention.

The mounting part 4 according to the present invention has the same configuration as the mounting part 4 shown in FIG. 2, given the mounting hole 41. In a case of mounting the network concentrator 1 on a magnetic surface, the mounting piece 5 shown in FIG. 3 is used. That is, the mounting piece 5 is fixed to the mounting part 4 by inserting the head portion 51 into the inserting portion 411 of the mounting hole 41 to bring the mounting part 4 into contact with an upper surface of the magnet holding portion 53, and then sifting the mounting part 4 to such a position that the neck portion 52 is engaged into the holding portion 412. The mounting piece 5, which has been fixed to the mounting part 4, is then brought into contact with a magnetic mounting surface, and magnetic force of the magnet 54 allows the network concentrator 1 to be mounted on the mounting surface.

It is also possible to mount the mounting piece 5 on the mounting surface in advance, and then insert the head portion 51 of the mounting piece 5 into the inserting hole 41 of the network concentrator 1, thereby mounting the network concentrator 1 on the mounting surface.

Figure 5:
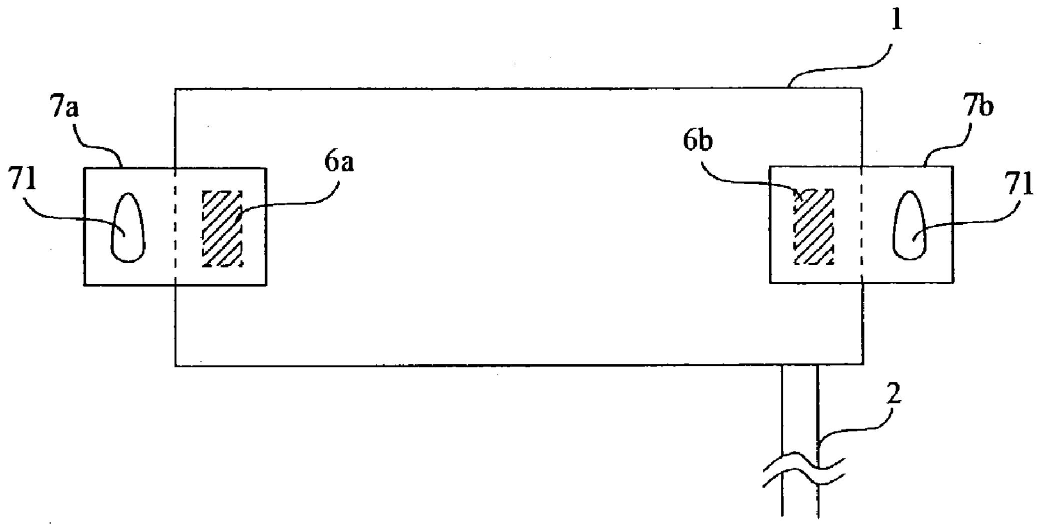
FIG. 5 is a view to show a network concentrator according to the third embodiment of the present invention.

FIG. 5 shows a configuration of the network concentrator 1 according to the third embodiment of the present invention. A rear surface of the network concentrator 1, that is, a surface to contact with a mounting surface is shown therein. The network concentrator 1 according to the present invention has the same configuration as the network concentrator 1 according the first embodiment explained above, except a mounting structure.

As shown in FIG. 5, the network concentrator 1 is provided with at least one magnet on its rear surface, and more preferable, two magnets 6*a* and 6*b* at positions close to the right edge and the left edge are provided. More specifically, the rear surface of the network concentrator 1 is made hollow so as to hold the magnet or magnets. The magnet or magnets can be fixed to the hollow by an adhesive agent, for example.

If a mounting surface is magnetic, the network concentrator 1 can be fixed to the mounting surface by magnetic force of the magnet.

On the other hand, if a mounting surface is not magnetic, at least one magnetic piece, which is a separate part from the network concentrator 1, is used. In the embodiment of FIG. 5, for example, two of the mounting pieces 7*a* and 7*b* are used. The mounting pieces 7*a* and 7*b* are symmetrical to each other. The mounting pieces are each made of magnetic material to which a magnet can be attached; for example, metal such as iron is used. Each mounting piece can be a flat plate with a mounting hole 71 at a position close to its edge as shown FIG. 5. The mounting hole 71 extends completely through the mounting piece.

In this case, the mounting piece or pieces can be first attached to the magnet or magnets provided on the rear surface of the network concentrator 1. Then, a screw or the like can be fixed to a mounting surface so that a head portion can be engaged using the mounting hole 71, thereby mounting the network concentrator 1 on the mounting surface.

It is also possible to mount the network concentrator 1 with the mounting piece or pieces attached to its rear surface on a magnetic mounting surface because the magnetic force of the magnet or magnets 6*a* and 6*b* will be strong enough to mount to the mounting surface through the mounting piece or pieces.

Figure 6:
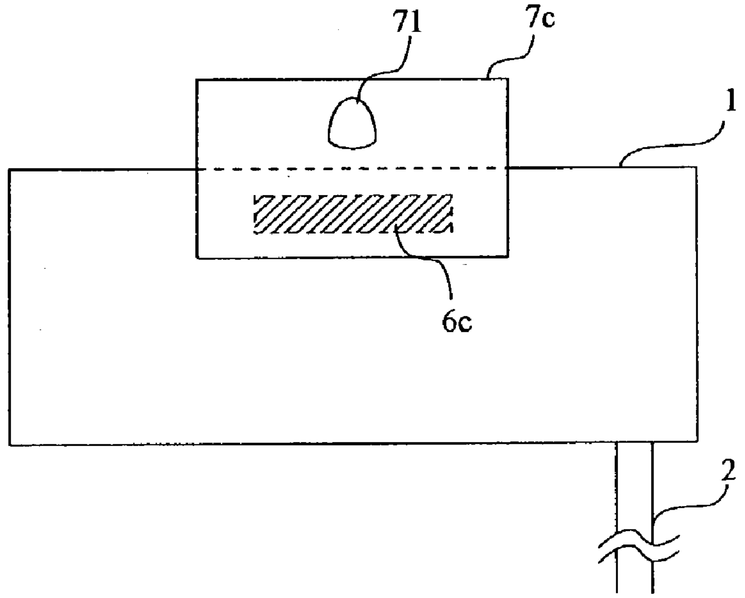
FIG. 6 is a view to show a network concentrator according to the fourth embodiment of the present invention.

FIG. 6 shows a configuration of a network concentrator 1 according to the fourth embodiment of the present invention. A rear surface of the network concentrator 1, that is, a surface to contact with a mounting surface, is shown therein. The network concentrator 1 according to the present embodiment has the same configuration as the network concentrator 1 according to the first embodiment explained above, except a mounting structure.

As shown in FIG. 6, the network concentrator 1 is provided with the magnet 6*c* on its rear surface. There is provided in this case a single magnet 6*c* at an upper middle part of the rear surface. More specifically, the rear surface of the network concentrator has at least a hollow portion, and the magnet 6*c* is engaged in this hollow portion. The magnet 6*c* is fixed to the hollow portion by an adhesive agent, for example.

If a mounting surface is magnetic, the network concentrator 1 can be fixed to the mounting surface by magnetic force of the magnet 6*c*.

On the other hand, if the mounting surface is not magnetic, a magnetic piece, which is a separate part from the network concentrator 1, is used. A single mounting piece 7*c* is used as the mounting piece in this case. The mounting piece 7*c* is made of magnetic material; for example, metal such as iron is used. The mounting piece 7*c* is a flat plate, and has a mounting hole 71 at a position close to its edge. The mounting hole 71 extends completely through the mounting piece.

Although the first and second embodiments of the present invention have explained a case where the mounting piece has the head portion 51 whose diameter is larger than that of the neck portion 52, it is not restricted thereto. For example, the diameter of the head portion 51 and the neck portion 52 may be the same, or the diameter of the head portion 51 may be smaller than that of the neck portion 52.

Also, though the first and second embodiments have explained a case where the mounting part 4 projects outside from the main body of the network concentrator 1, the mounting part 4 may be provided on the rear surface of the main body. This configuration allows miniaturization of the main body.

Further, the mounting hole 41 provided on the mounting part 4 explained in the first and second embodiments is a penetration, it is not limited thereto. For example, the mounting hole 41 may be a groove if the mounting part 4 is a thick flat plate.

The third and fourth embodiments of the present invention have explained a case where the whole mounting piece is magnetic; however, it is possible that only a part of the mounting piece is magnetic. That is, the part to be attached to the magnet provided on the main body of the network concentrator should be magnetic, and the other part may be made of synthetic resin, for example. The configuration saves weight of the mounting piece, and also achieves unity in appearance by using the same material as the main body of the network concentrator 1.

Also, the mounting hole 71 provided on the mounting part explained in the third and fourth embodiments is illustrated as a hole, but it is not limited theretol. For example, the mounting hole 71 may be formed as a groove if the mounting part 4 is a thick flat plate.

Further, though the third and fourth embodiments have explained a case of providing the rear surface of the network concentrator with the magnet, it is possible to make a part of the rear surface of the network concentrator 1 by magnetic material such as iron, and provide the mounting piece with both the magnet and the mounting hole. In this configuration, it is possible that, if the network concentrator 1 has a magnetic body, the network concentrator 1 is mounted on both magnetic and non-magnetic surfaces without having any mounting structure.

As explained in the foregoing, the present invention provides amounting method, a mounting piece, and amounting system for a network concentrator capable of mounting a network concentrator on a mounting surface in a simple configuration.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mounting system, comprising:

a network concentrator including a power cord and a connector provided on a lower surface thereof and having a planar contact surface to contact with a magnetic mounting surface substantially perpendicular to a ground and having first and second mounting parts each including a mounting hole, the first mounting part projecting from a first side surface of the network concentrator and positioned substantially on a plane of the planar contact surface, the second mounting part projecting from a second side surface of the network concentrator opposite the first side surface and positioned substantially on the plane of the planar contact surface, and the network concentrator configured to be mounted on the magnetic mounting surface; and first and second separate mounting pieces, the first and second separate mounting pieces each including, a projecting portion including a round head portion overlying a round neck portion narrower than the round head portion, the round head portion being sized to be inserted into the respective mounting hole, and a magnet configured to be attached to the magnetic mounting surface to mount the respective mounting piece and the network concentrator to the magnetic mounting surface.

2. A method of mounting a network concentrator on a mounting surface, comprising:

providing the network concentrator having a planar contact surface to contact with the mounting surface and having first and second mounting parts each including a mounting hole, the first mounting part projecting from a first side surface of the network concentrator and positioned substantially on a plane of the planar contact surface, and the second mounting part projecting from a second side surface of the network concentrator opposite the first side surface and positioned substantially on the plane of the planar contact surface;

providing first and second mounting pieces each including a magnet and a projecting portion, the first and second mounting pieces each being a separate part from the network concentrator;

attaching the first and second mounting pieces to the mounting surface by the magnets; and inserting the projecting portion of the first mounting piece into the mounting hole of the first mounting part, and inserting the projecting portion of the second mounting piece into the mounting hole of the second mounting part such that the projecting portions penetrate through the mounting holes of the first and second mounting parts to mount the network concentrator on the mounting surface with a lower surface of the network concentrator provided with a power cord and a connector facing a ground.

3. A method according to claim 2, wherein each of the mounting holes of the first and second mounting parts comprises:

an inserting portion having a circular shape; and a holding portion extending with a width smaller than a diameter of the inserting portion, wherein each of the projecting portions of the first and second mounting pieces is inserted into the inserting portion and then shifted to the holding portion.

4. A method according to claim 3, wherein each of the projecting portions of the first and second mounting pieces comprises:

a head portion having a width wider than the holding portion and narrower than the inserting portion; and a neck portion having a width narrower than the holding portion.

* * * * *